(12) United States Patent
Thompson et al.

(10) Patent No.: US 6,994,274 B2
(45) Date of Patent: Feb. 7, 2006

(54) TANK FOR A SPRAYER SYSTEM

(75) Inventors: Peter Thompson, North Olmstead, OH (US); Jimmy N. Eavenson, Sr., Aurora, OH (US); Michael Utz, Streetsboro, OH (US)

(73) Assignee: Commercial Turf Products, Streetsboro, OH (US)

( * ) Notice: Subject to any disclaimer, the term of this patent is extended or adjusted under 35 U.S.C. 154(b) by 585 days.

(21) Appl. No.: 10/027,108

(22) Filed: Dec. 20, 2001

(65) Prior Publication Data

US 2003/0116644 A1 Jun. 26, 2003

(51) Int. Cl.
 *B05B 9/03* (2006.01)

(52) U.S. Cl. .................................... 239/146; 239/160
(58) Field of Classification Search ............... 239/146, 239/159–161, 163–170, 172, 175, 176, 302, 239/332, 537; 220/20, 22, 22.1–22.6; 296/37.6, 296/37.1; 169/24
See application file for complete search history.

(56) References Cited

U.S. PATENT DOCUMENTS

| | | | |
|---|---|---|---|
| 3,770,060 A | * 11/1973 | Forsyth et al. ............. | 169/24 |
| 3,854,621 A | * 12/1974 | Parry ....................... | 220/554 |
| 3,865,308 A | * 2/1975 | Pringle et al. ............. | 239/61 |
| 3,902,667 A | 9/1975 | Jackson | |
| 4,140,349 A | * 2/1979 | Behnken .................... | 406/39 |
| 4,161,280 A | 7/1979 | Kasinskas | |
| 4,186,885 A | 2/1980 | Christian | |
| 4,213,565 A | 7/1980 | Jackson | |
| 4,234,109 A | 11/1980 | Goodhart | |
| 4,311,274 A | * 1/1982 | Neal ........................ | 239/1 |
| 4,593,855 A | 6/1986 | Forsyth | |
| 4,784,324 A | 11/1988 | DeWitt et al. | |
| 5,180,108 A | 1/1993 | Miyamoto | |
| 5,303,866 A | * 4/1994 | Hawks, Jr. ................. | 239/142 |
| 5,397,056 A | 3/1995 | Sakatani et al. | |
| 5,403,128 A | 4/1995 | Thomas | |
| 5,496,111 A | 3/1996 | LaVerne | |
| 5,564,628 A | 10/1996 | Hall et al. | |
| 5,615,922 A | * 4/1997 | Blanchard .................. | 296/37.6 |
| 5,975,162 A | * 11/1999 | Link, Jr. ................... | 141/231 |
| 6,095,429 A | * 8/2000 | Killgrove et al. ........... | 239/172 |
| 6,164,560 A | 12/2000 | Lehrke et al. | |
| 6,206,302 B1 | 3/2001 | Hansen et al. | |
| 6,234,408 B1 | * 5/2001 | Stevens et al. ............. | 239/172 |

\* cited by examiner

*Primary Examiner*—Gene Mancene
*Assistant Examiner*—Thach H. Bui
(74) *Attorney, Agent, or Firm*—Wegman Hessler & Vanderburg (57) ABSTRACT

The present invention provides a tank having a bottom portion that is adapted to be received by a truck platform between the wheel wells so that the tank can be easily moved past the wheel wells. In addition, the tank preferably has a first top panel that is adapted to receive the pump, engine, hose and/or reel. Since the foregoing are mounted onto the tank, the useable space on the platform is increased. Further, the first top panel is preferably positioned near the edge of the platform so that the sprayer system controls are accessible and convenient for a user.

25 Claims, 5 Drawing Sheets

TANK FOR A SPRAYER SYSTEM

BACKGROUND OF THE INVENTION

I. Field of the Invention

The present invention relates to sprayer systems, such as are commonly used to discharge chemicals to eradicate weeds, insects, etc. The invention more particularly refers to a sprayer system that is mounted onto the platform of a vehicle for easy maneuverability, and even more particularly to a tank for a sprayer system that is adapted to be received by the platform of the vehicle such that it can be easily moved between the wheel wells of the vehicle.

II. Description of the Related Art

The present invention contemplates a new and improved tank for a sprayer system which is simple in design, effective in use, and overcomes the foregoing difficulties and others while providing better and more advantageous overall results.

Sprayer systems for discharging chemical substances, such as pesticides, are well known in the art. Typically, the systems include a pump, an engine, a tank, and a hose. The system may also include a reel for holding the hose.

It is also well known in the art to mount these sprayer systems to the platform of a vehicle, such as a truck, to facilitate in the discharge of the chemical substances. The tank is commonly attached to a frame, which, in turn, is attached to the platform of the truck. The frame secures the tank to the truck and prevents unwanted movement of the tank. The pump, engine, hose and/or reel are then either attached to the frame or otherwise positioned on the truck.

Unfortunately, the presently used tanks are inefficiently designed and, thus, the amount of useable space on the truck platform is significantly reduced. In addition, the fit of the assembled sprayers within the platform is compromised and the accessibility of the controls for the sprayer system is restricted.

The present invention attempts to overcome these deficiencies in the prior art by providing for a tank that is compact and can be easily maneuvered within the platform of the truck. This is accomplished by providing a tank having a bottom portion that is adapted to be received by a truck platform between the wheel wells so that the tank can be easily moved past the wheel wells. This enables the tank to be placed in numerous positions on the truck platform. In addition, the tank preferably has a first top panel that is adapted to receive the pump, engine, hose and/or reel. Since the foregoing are mounted onto the tank, the useable space on the platform is increased. Further, the first top panel is preferably positioned near the edge of the platform so that the sprayer system controls are easily accessible and convenient for a user.

SUMMARY OF THE INVENTION

In accordance with the present invention, a new and improved tank for a sprayer system is provided which is designed to increase the usable space on the platform of a vehicle.

The tank has a top and a bottom portion. The bottom portion of the tank is adapted to be received by the platform between the wheel wells. This enables the tank to be easily moved from a first position, which is toward the front of the vehicle and behind the wheel wells, to a second position, which is toward the back of the vehicle and in front of the wheel wells. The tank can be moved past the wheel wells by sliding it across the platform of the vehicle. Since the tank does not have to be lifted above the wheel wells to be moved, the possibility of back strain or other medical problems that are associated with the lifting heavy objects is reduced, if not completely eliminated.

Preferably, the bottom portion of the tank has a length L1 which is less than the length L2 between the wheel wells of the vehicle. Similarly, the top portion of the tank preferably has a length L3 which is less than or equal to the length L4 of the vehicle platform. This prevents the tank from extending outside of the perimeter of the platform. As such, the vehicle can be more easily maneuvered and the hazards associated with an object extending beyond the perimeter of a vehicle are eliminated.

Preferably, the tank includes a first top panel. The first top panel is substantially horizontal and has a first surface that is adapted to receive an associated pump and/or engine. The fist top panel may also include a second surface that is adapted to receive a reel. The first top panel is preferably positioned at one end of the tank, near the edge of the platform. This enables a user to easily access the controls of the sprayer system. Further, the controls can be positioned such that they can be easily accessed by a user standing outside of the vehicle on a curb.

Preferably, the tank is mounted onto a frame, which, in turn, is attached to the vehicle. The frame secures the tank to the vehicle and prevents unwanted movement of the tank. The engine, pump, hose and/or reel can be mounted to either the tank or the frame. If the foregoing are mounted to the frame, they are preferably located in positions that are substantially equivalent to their positions on the tank, as described above.

It is an objective of this invention to provide a tank that is easily and efficiently manufactured and marketed.

It is a further objective of this invention to provide a tank that is of durable and reliable construction.

It is still a further objective of this invention to provide a tank that has all of the advantages of the prior tanks and none of the disadvantages.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
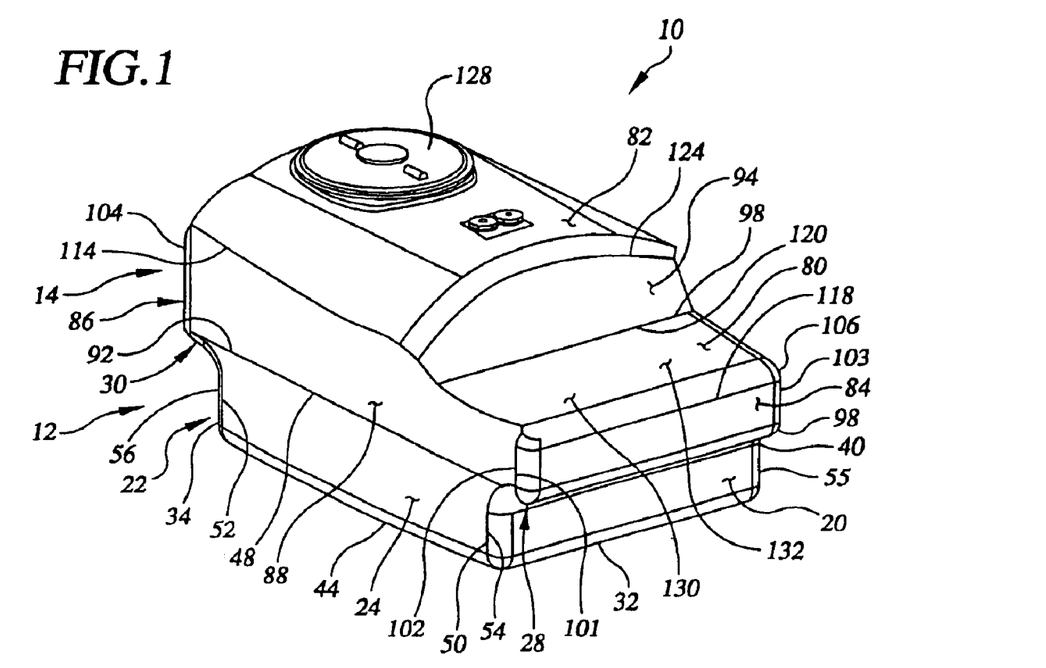
FIG. 1 is a perspective view of the tank.
Figure 2:
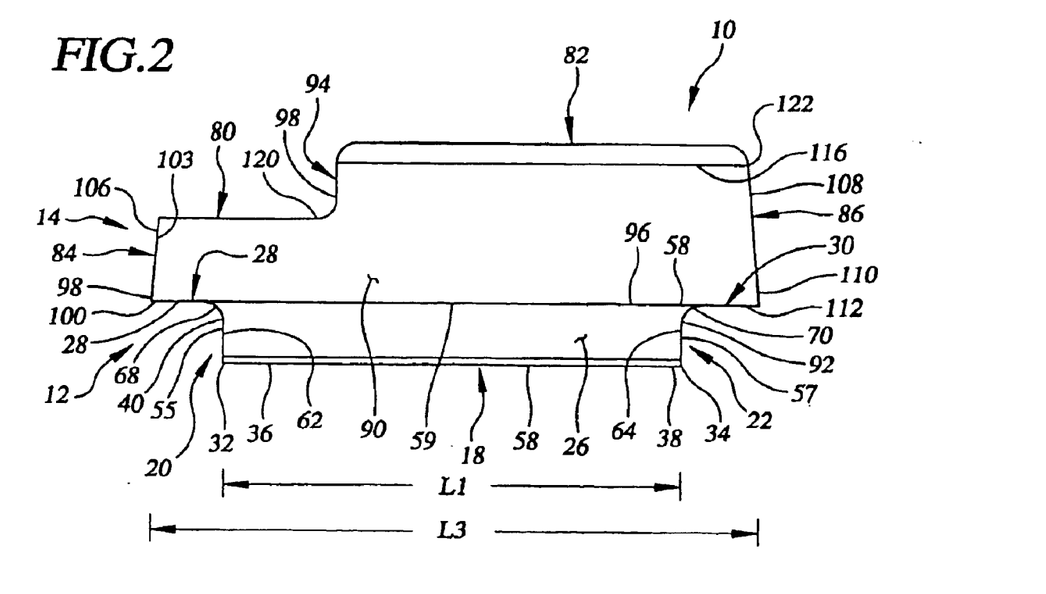
FIG. 2 is a side view of the tank.
Figure 3:
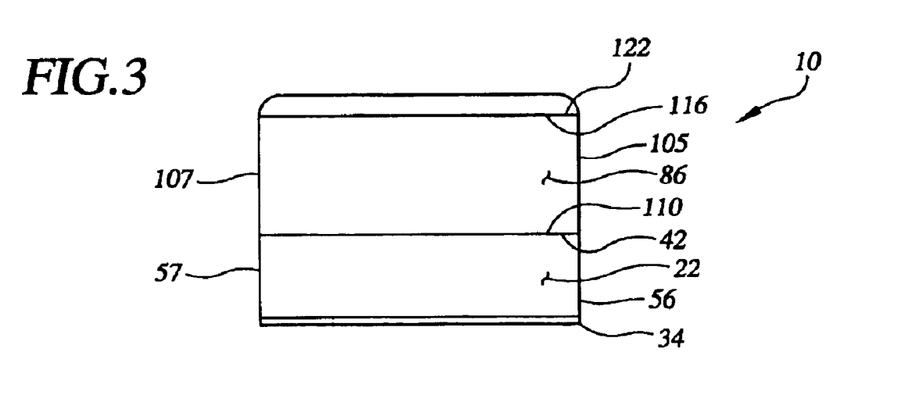
FIG. 3 is a back view of the tank.
Figure 4:
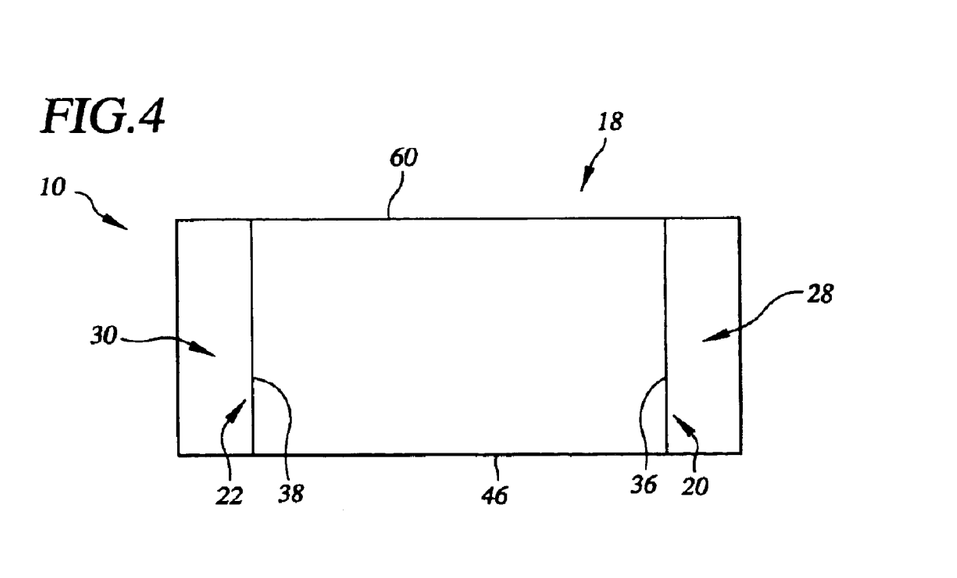
FIG. 4 is a bottom view of the tank.
Figure 5:
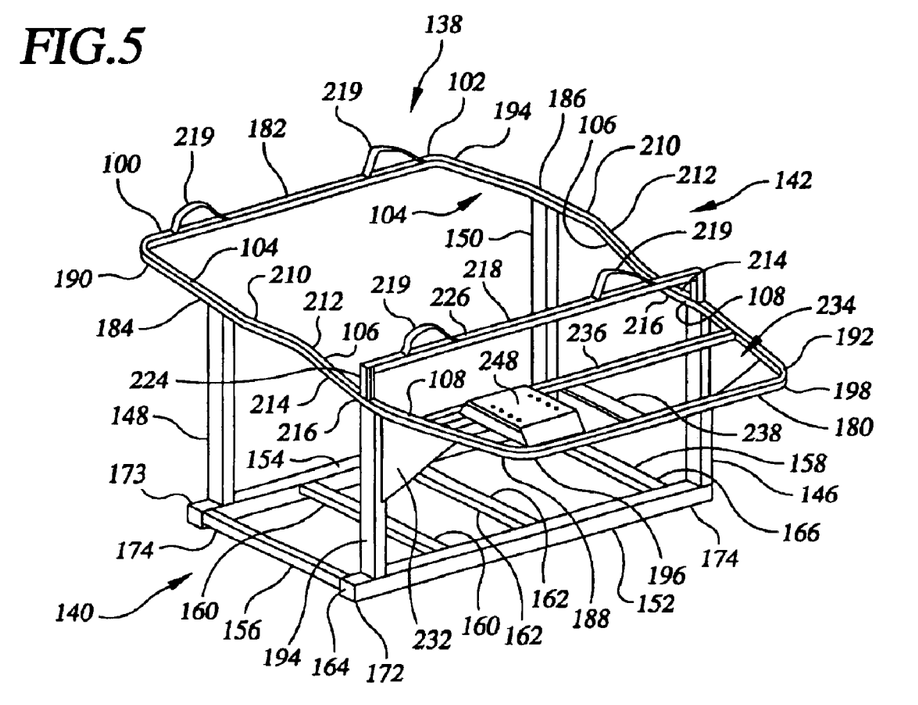
FIG. 5 is a perspective view of the frame.
Figure 6:
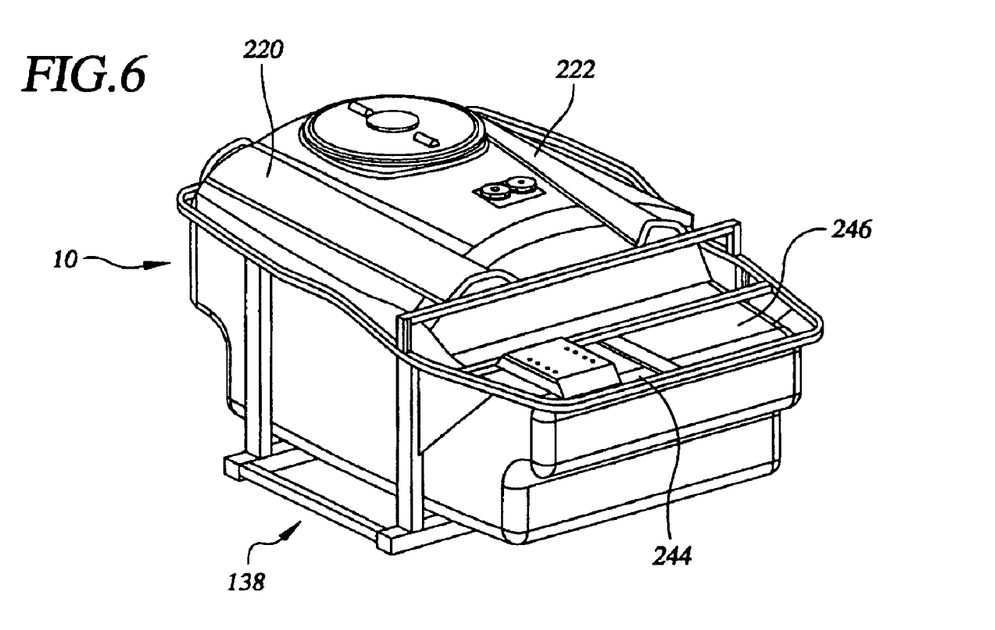
FIG. 6 is a perspective of view of the tank, illustrating the frame attached to tank.
Figure 7:
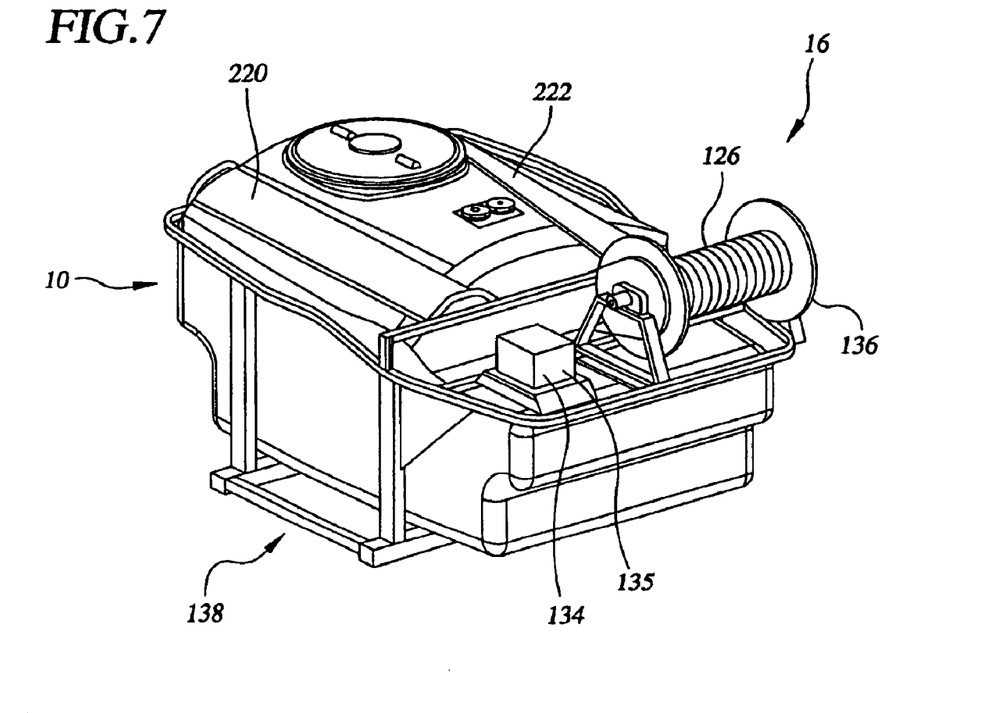
FIG. 7 is a perspective view of the tank, illustrating the engine, pump, and reel mounted onto the first top panel of the tank.
Figure 8:
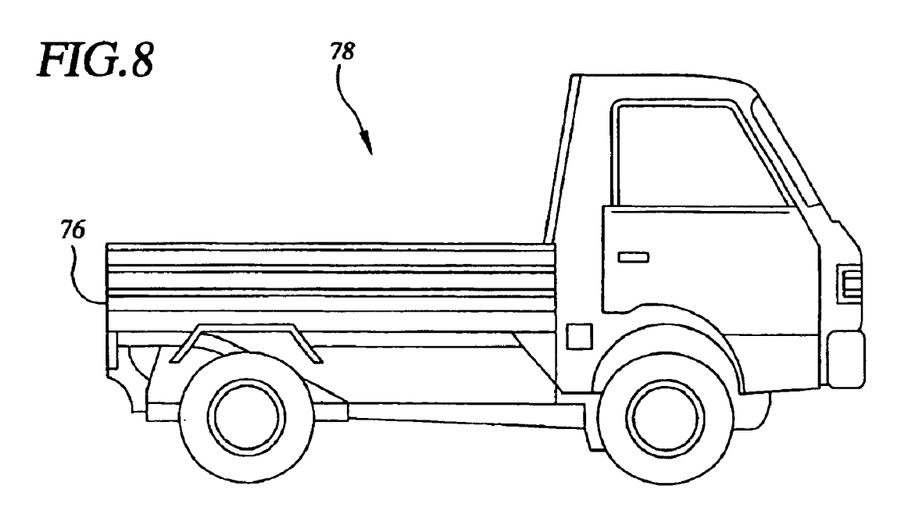
FIG. 8 is a side view of a truck.
Figure 9:
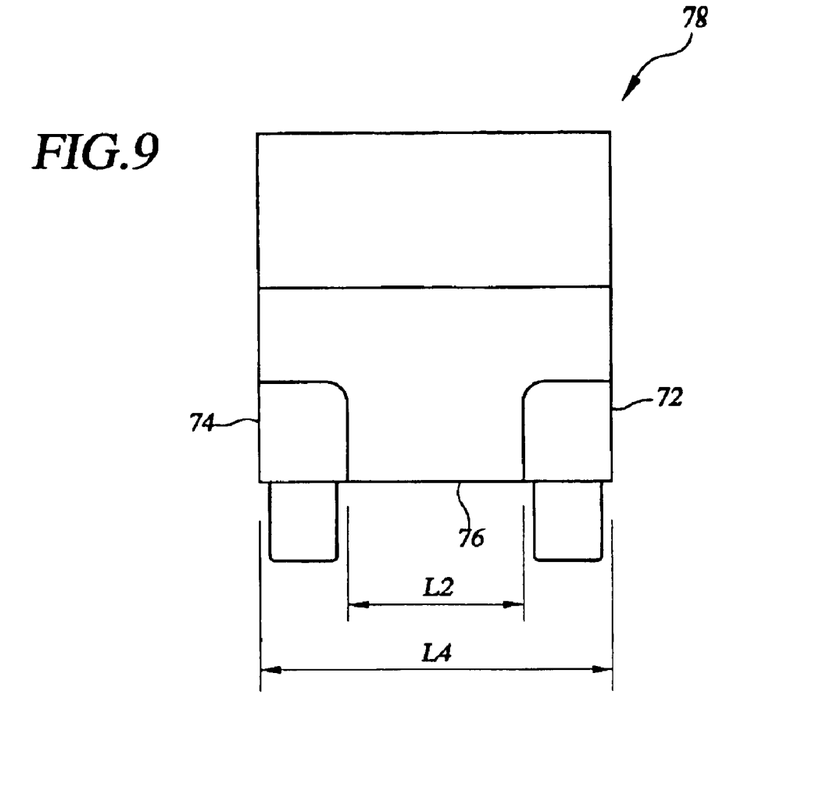
FIG. 9 is a rear view of a truck.
Figure 10:
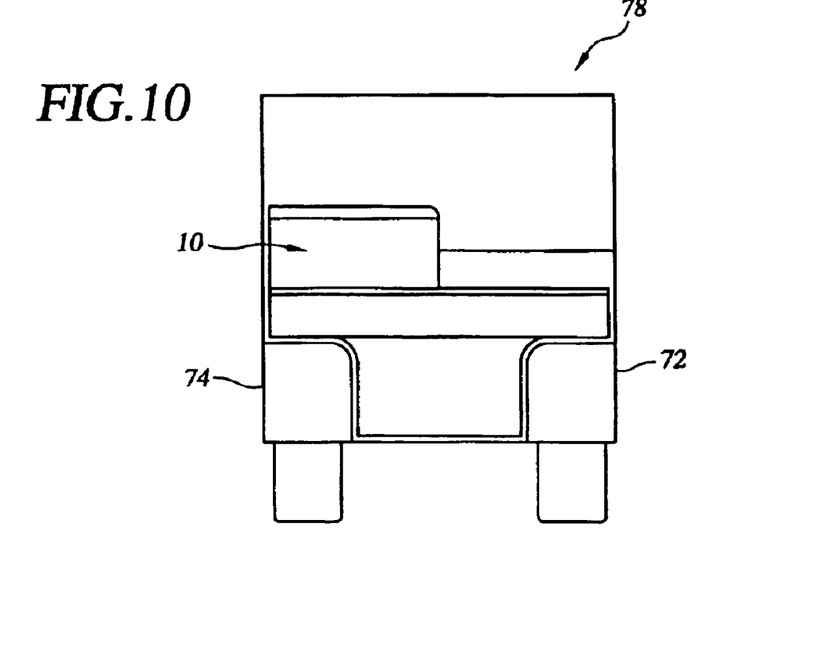
FIG. 10 is a rear view of a truck showing the tank positioned on the platform of the truck.

Referring now to the drawings, which are for purposes of illustrating a preferred embodiment of the invention only, and not for purposes of limiting the invention FIGS. 1–4 show a preferred embodiment of a tank 10, FIG. 5 shows a preferred embodiment of a frame 138, FIG. 6 shows the tank 10, positioned within the frame 138, FIG. 7 shows a pump 134, engine 135 and reel 136 mounted onto the frame 138, FIGS. 8 and 9 show an associated truck 78, and FIG. 10 shows the tank 10, placed on the platform 76, of the associated truck 78.

With reference to FIGS. 1–4 and 7, a preferred embodiment of the tank 10 is illustrated. The tank 10 is comprised of a bottom portion 12 and a top portion 14, which define a cavity for holding chemicals, such as pesticides, that are to be discharged by a sprayer system 16. In this embodiment, the bottom portion 12 has a generally rectangular or square shape. The bottom portion 12 includes a bottom panel 18, a right or first side panel 20, a left or second side panel 22, a front panel 24, a back panel 26, a right or first rim panel 28 and a left or second rim panel 30. The front and back panels 24, 26 have an equivalent length L1, shown in FIG. 2. The length L1 is less than length L2, shown in FIGS. 9 and 10, between the wheel wells 72, 74 of the vehicle 78, to enable the tank 10 to easily move past the wheel wells 72, 74. The first and second side panels 20, 22 are positioned substantially opposite each other on substantially vertically-oriented planes with their lower ends 32, 34 attached to the corresponding ends 36, 38 of the bottom panel 18 and their upper ends 40, 42 extending substantially upward. The front panel 24 is positioned between the first and second side panels 20, 22 on a substantially vertically-oriented plane with its lower end 44 attached to the corresponding end 46 of the bottom panel 18 and its upper end 48 extending substantially upward. Sides 50, 52 of the front panel 24 are attached to corresponding sides 54, 56 of the first and second side panels 20, 22. The back panel 26 is positioned substantially opposite the front panel 24 between the first and second side panels 20, 22 on a substantially vertically oriented plane. A lower end 58 of the back panel 26 is attached to a corresponding end 60 of the bottom panel 18 and its upper end of the back panel 59 extends substantially upward. Sides 62, 64 of the back panel 26 are attached to corresponding sides 55, 57 of the first and second side panels 20, 22. A first rim panel 28 is positioned on a substantially horizontally oriented plane with its corresponding end 68 attached to the upper end 40 of the first side panel 20. A second rim panel 30 is also positioned on a substantially horizontally oriented plane with its corresponding end 70 attached to the upper end 42 of the second side panel 20.

In the preferred embodiment, the first and second side panels 20, 22 are curved and the remaining panels 18, 24, 26, 28, 30 of the bottom portion 12 are substantially planar. The curve is substantially equivalent to the curve of a standard wheel well 72, 74. The curve of the first and second side panels 20, 22 facilitates movement of the tank 10 past the wheel wells 72, 74. However, the panels 18,20,22,24,26,28, 30 can have any shape chosen using sound engineering judgment.

With continuing reference to FIGS. 1–4, the top portion 14 of the tank 10 is comprised of a right or first top panel 80, a left or a second top panel 82, a right or a first side panel 84, a left or a second side panel 86, a front panel 88, a back panel 90 and a middle panel 94. The front and back panels 88, 90 have an equivalent length L3, shown in FIG. 2. Lower end 92 of the front panel 88 of the top portion 14 is attached to the upper end 48 of the front panel 24 of the bottom portion 12 and is positioned on a substantially vertically oriented plane. Lower end 96 of the back panel 90 of the top portion 14 is attached to an upper end 59 of the back panel 26 of the bottom portion 12 and is positioned on a substantially vertically oriented plane. Lower end 98 of the first side panel 84 is attached to outer end 100 of the first rim panel 28 and is positioned in a substantially vertically oriented plane. Sides 101, 103 of the first side panel 84 are attached to corresponding sides 102, 106 of the front and back panels 88, 90. Lower end 110 of the second side panel 86 is attached to the outer end of the second rim panel 30 and is positioned in a substantially vertically oriented plane. Sides 105,107 of the second side panel 86 are attached to corresponding sides 104, 108 of the front and back panels 88, 90. The first top panel 80 is positioned in a substantially horizontally oriented plane and is attached to upper ends 114, 116, 118 of the front panel 88, the back panel 90, and the first side panel 84. The first top panel 80 preferably extends across approximately one-third of the length L3. The middle panel 94 is positioned substantially opposite the first side panel 84 in a substantially vertically oriented panel with its lower end 98 attached to end 120 of the first top panel 80. The second top panel 82 is positioned in a substantially horizontally oriented plane and is attached to the upper ends 114, 116, 122, 124 of the front 88, back 90, second side 86 and middle panels 94. The second top panel 82 extends approximately two-thirds of the length L3. The second top panel 82 preferably includes an inlet 128 for receiving a hose 126 of the sprayer system 16.

In the preferred embodiment of this invention the pump 134, engine 135, and reel 136 are attached to the frame 138, shown in FIG. 5. However, the foregoing may also be attached to the tank 10. In such instance, the first top panel 80 will include first and second surfaces 130, 132. The first surface of the top panel 130 is adapted to receive the engine and/or pump 134 of the sprayer system 116. The second surface 132 is adapted to receive an optional reel 136, which holds the hose 126. The placement of the engine 135, pump 134 and/or reel 136 on the first top panel 130 of the tank 10 increases the usable space of the platform 76. In addition, this placement allows the controls for the foregoing parts of the sprayer system 116 to be positioned such that they can be easily accessed by a user.

In the preferred embodiment, the second top panel 82 is curved and the remaining panels 80, 84, 86, 88, 90 of the top portion 14 are substantially planar. The curved shape increases the volume of the tank 10 and, thus, enables the tank 10 to store more chemicals. However, the panels 80, 82, 84, 86, 88, 90 can have any shape chosen using sound engineering judgment.

In the preferred embodiment, the length L3 is less than length L4 of the vehicle platform 76, shown in FIGS. 9 and 10. This enables the tank 10 to be easily maneuvered and prevents the tank 10 from extending outside of the platform 76 and creating a hazard. However, this is only a preferred embodiment of the invention and should not be construed to limit the invention in any manner. As such, the upper portion 14 of the tank 10 can have any length L3 chosen using sound engineering judgment.

The tank 10 can be comprised of any material chosen using sound engineering judgment, such as metal or polymeric materials.

The tank 10 has been described with reference to its preferred embodiment. However, this is only a preferred embodiment and should not be construed to limit the invention in any manner. The tank 10 can have any shape chosen using sound engineering judgment, so long as the length L1 is less than the length L2. In addition, the tank 10 can be a single unitary piece, or it can be comprised of individual components. If the tank is comprised of individual components, the components can have any form chosen using sound engineering judgment and are not limited to the components described herein, which are only a preferred embodiment of the invention.

With reference to FIG. 5, the frame 138 for use in connecting the tank 10 to the platform 76, shown in FIGS. 8–10, is illustrated. The frame 138 is comprised of a bottom frame portion 140, a top frame portion 142, and support bars 144, 146, 148, 150 for attaching the bottom frame portion 140 to the top frame portion 142. The bottom frame portion 140 has a substantially planar rectangular or square shape and is adapted to receive the bottom portion 12 of the tank 10. The bottom frame portion 140 is comprised of a right or first side bar 152, a left or second side bar 154, a front bar 156, a back bar 158, and first and second support bars 160, 162. The front and back bars 156, 158 are positioned substantially opposite each other. Ends 172, 174 of the first side bar 152 are attached to the corresponding ends 164, 168 of the front and back bars 156, 158. Similarly, ends 173, of the second side bar 154 are attached to a corresponding end 174 of the first and second side bars 154, 156. First and second support bars 160, 162 are positioned between the front and back bars 156, 158 and attached to the first and second sidebars 152, 154. Preferably, the distance between the front and back bars 156, 158 and the first and second support bars 160, 162 are substantially equal.

With continuing reference to FIG. 5, the top frame portion 142 is illustrated. The top frame portion 142 has a substantially rectangular shape and is comprised of a right or first side bar 180, a left or second side bar 182, a front bar 184, and a back bar 186. The front and back bars 184, 186 are positioned substantially opposite each other. The ends of first side bar 196, 198 are attached to corresponding ends 188, 192 of the front and back bars 184, 186. Similarly, ends 100, 102 of second side bar 182 are attached to corresponding ends 190, 194 of the front and back bars 184, 186. The front and back bars 184, 186 each have a first, second, and third member 204, 206, 208. The first member 104 is positioned in a substantially horizontally oriented plane and end 210 of the first member 104 is attached to the left or first end 212 of the second member 206. The second member 206 is preferably angled downward and the right or second end 214 of the second member 206 is attached to end 216 of the third member 208.

Preferably, the top frame 142 includes first, second, and third top bars 218, 220, 222, shown best in FIGS. 6 and 7. The first top bar 218 has a first member 224, which is positioned in a substantially vertically-oriented plane and is attached to and extends substantially upward from the first side bar 184, a second member 226, which is positioned in a substantially horizontally-oriented plane and is attached to the first member 224 and extends across the frame 138 toward the back bar 186, and a third member 228, which is positioned in a substantially vertically-oriented plane and is attached to and extends downward from the second member 226 and is attached to the back bar 186. The first top bar 218 is positioned such that it is located near the middle panel 94 of the tank 10. The second and third top bars 220, 222 are positioned in a substantially horizontally-oriented plane and are removeably attached to the second side bar 182 and the first top bar 218 via brackets 219. The second and third top bars 220, 222 are removeably attached to the frame 138 to enable the tank 10 to be easily placed within the frame 138, as shown best in FIG. 6.

The top frame 142 may also include first and second support members 232, 234. The support members 232, 234 are preferably triangular in shape. The first support member 232 is attached to the first support bar 144 and the third portion of the front bar 208. The second support member 234 is attached to the second support bar 146 and the third portion of the back bar 208.

Preferably, the top portion 142 of the frame 138 includes first and second platform bars 236, 238 that are adapted to receive the pump 134, engine 135, and reel 136. The first platform bar 236 is positioned substantially opposite the first side bar 180 and is attached to the third portion 216 of the front and back bars 184, 186. The distance between the first platform bar 236 and the first side bar 180 is sufficient to enable the reel 136 to be attached thereto, as shown best in FIG. 7. A second platform bar 238 is positioned between the front and back bars 184, 186 and is oriented substantially parallel thereto. The second platform bar 238 defines a first area 244 for receiving the pump and/or engine 134 and a second area 246 for receiving the reel 136, shown best in FIG. 6. A plate 248 may be attached to the first side bar 180 and the first platform bar 236 to aid in the reception of the engine and/or pump 134.

Preferably, the first and second areas 244, 246 of the frame 138 correspond to the first and second surfaces 130, 132 of the tank 10. However, the engine 134, pump 134, and reel 136 can be attached to the frame 138 at any location and in any manner chosen using sound engineering judgment.

The frame 138 can be comprised of any material chosen using sound engineering judgment, such as metal or polymeric materials The frame 138 has been described with reference to its preferred embodiment. However, this is only a preferred embodiment and should not be construed to limit the invention in any manner. The frame can have any shape chosen using sound engineering, so long as it is capable of receiving the tank 10. In addition, the frame 138 can be a single unitary piece or it can be comprised of individual components. If the frame 138 is comprised of individual components, the components can have any form chosen using sound engineering judgment and are not limited to the components described herein, which are only a preferred embodiment of the invention.

In the preferred embodiment, the tank 10 is attached to the platform 76 of the vehicle 78 via the frame 138. However, the tank 10 can be attached to the vehicle 78 by any means chosen using sound engineering judgment. Similarly, the tank 10 can be placed on the platform 76 without the aid of a securing means, such as the frame 138.

The connections between the tank 10, engine 134, pump 134, hose 126, and optionally, the reel 136 are well known in the art and, thus, will not be described in detail herein.

The invention has been described with reference to the preferred embodiment Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. An apparatus for use with an associated vehicle, the vehicle having a platform with a length I4, the platform having first and second wheel wells positioned substantially opposite each other and having a length L2 therebetween, said apparatus comprising:

a tank having a bottom portion and a top portion, said bottom portion having a length L1 and said top portion having a length L3;

said bottom portion of said tank being adapted to be received by the platform; and, wherein said length L1 is less than the length L2 and said length L3 is less than the length L4 but greater than the length L2 thereby forming overhanging sections on opposite sides of the top portion that extend past the lower portion of the tank, the tank being positionable fore and aft on the platform by sliding the tank between the wheel wells.

2. The apparatus of claim 1, wherein said tank further comprises a first top panel, said first top panel being substantially horizontal, said first top panel having a first surface, and said first surface being adapted to receive an associated pump.

3. The apparatus of claim 2, wherein said first surface is adapted to receive an associated engine.

4. The apparatus of claim 3, wherein said first top panel further comprises a second surface, said second surface being adapted to receive an associated reel.

5. An apparatus for use with an associated vehicle, the vehicle having a platform with first and second wheel wells, the first and second wheel wells positioned substantially opposite each other, the apparatus comprising:
a tank having a top and a bottom portion the tank being positionable fore and aft on the platform by sliding the tank between the wheel wells;
wherein said bottom portion of said tank has a length that is smaller than the length between said first and second wheel wells such that the tank is adapted to be received by the platform between the first and second wheel wells and the top portion of the tank has a length that is greater than said length between said first and second wheel wells thereby forming overhanging sections on opposite sides of the top portion that extend past the lower portion of the tank.

6. The apparatus of claim 5 wherein said bottom portion of said tank has a length L1, the first and second wheel wells have a length L2 therebetween, and said length L1 is less than the length L2.

7. The apparatus of claim 6, wherein said top portion of said tank has a length L3, the platform has a length L4, and said length L3 is substantially equal to the length L4.

8. The apparatus of claim 6, wherein said top portion of said tank has a length L3, the platform has a length L4, and said length L3 is less than the length L4.

9. The apparatus of claim 5, wherein said tank further comprises a first top panel, said first top panel being substantially horizontal, said first top panel having a first surface, and said first surface being adapted to receive an associated pump.

10. The apparatus of claim 9, wherein said first surface is adapted to receive an associated engine.

11. The apparatus of claim 10, wherein said first top panel further comprises a second surface and said second surface is adapted to receive a reel.

12. A sprayer system for use with an associated vehicle with a platform having first and second wheel wells positioned substantially opposite each other and having a length L2 therebetween, the sprayer system being positionable fore and aft on the platform by sliding the system between the wheel wells, the sprayer system comprising:
a tank having a bottom portion with a length L1, said bottom portion of said tank being adapted to be received by the platform and said length L1 being less than the length L2, said tank further having a top portion with a length L3, said length L3 being greater than the length L2 thereby forming overhanging sections on opposite sides of the top portion that extend past the lower portion of the tank, the tank being adapted to slide on the platform past the wheel wells with the overhanging sections of the top section passing over the wheel wells;
a frame operatively attached to said tank and the associated vehicle;
a pump operatively attached to said tank;
an engine operatively attached to said pump; and
a hose and reel operatively attached to said tank adapted to dispense the contents of said tank via said pump, said reel mounted at least partially on one of overhanging sections of the upper portion so that the hose is adjacent a first side of the truck and accessible from said first side.

13. The sprayer system of claim 12, wherein said tank has a first top panel with a first surface and said first surface is adapted to receive said engine.

14. The sprayer system of claim 13, wherein said first surface is adapted to receive said pump.

15. The sprayer system of claim 14, wherein said first top panel has a second surface, said second surface being adapted to receive said reel.

16. The sprayer system of claim 15, wherein said hose is adapted to be received by said reel.

17. A sprayer system for use with an associated vehicle, the vehicle including a platform with first and second wheel wells, the first and second wheel wells positioned substantially opposite each, the sprayer system being positionable fore and aft on the platform by sliding the system between the wheel wells, said sprayer system comprising:
a tank having a top and a bottom portion, said bottom portion having a length L and said top portion having a length L3, said length L1 being less than said length L3 thereby forming overhanging sections on opposite sides of the top portion that extend past the lower portion of the tank;
said bottom portion of said tank being adapted to be received by the platform wherein said length L1 is smaller than the length between said first and second wheel wells such that the tank is adapted to be received between the first and second wheel wells and the length L3 is greater than said length between said first and second wheel wells so that the tank is adapted to slide on the platform past the wheel wells with the overhanging sections of the top section passing over the wheel wells;
a pump operatively attached to said tank;
an engine operatively attached to said pump; and
a hose and reel operatively attached to said tank adapted to dispense the contents of said tank via said pump, said reel mounted at least partially on one of overhanging sections of the upper portion so that the hose is adjacent a first side of the truck and accessible from said first side.

18. The sprayer system of claim 17, further including a frame operatively attached to said tank and the associated vehicle.

19. The sprayer system of claim 17, wherein said tank has a first top panel with a first surface and said first surface is adapted to receive said engine.

20. The sprayer system of claim 19, wherein said first surface is adapted to receive said pump.

21. The sprayer system of claim 20, wherein said first top panel has a second surface, said second surface being adapted to receive said reel.

22. The sprayer system of claim 21, wherein said hose is adapted to be received by said reel.

23. A method of mounting a sprayer system on a vehicle, comprising the steps of:

providing a tank having a bottom portion with a length L1 and a top portion with a length L3, L3 being greater than L1 thereby forming overhanging sections on opposite sides of the top portion that extend past the lower portion of the tank;

providing a vehicle having a platform with first and second wheel wells positioned substantially opposite each other and having a length L2 therebetween, L2 being greater than L1 but less than L3;

said tank being positioned on said platform at a first position aft of the wheel wells;

moving said tank from said first position past said wheel wells to a second position forward of said wheel wells by sliding the system between the wheel wells with the overhanging sections of the top section passing over the wheel wells.

24. The sprayer system of claim 12, wherein said first side is opposite a driver's side of the vehicle.

25. The sprayer system of claim 17, wherein said first side is opposite a driver's side of the vehicle.

* * * * *

UNITED STATES PATENT AND TRADEMARK OFFICE
CERTIFICATE OF CORRECTION

PATENT NO. : 6,994,274 B2
DATED : February 7, 2006
INVENTOR(S) : Peter Thompson, Jimmy N. Eavenson, Sr. and Michael Utz It is certified that error appears in the above-identified patent and that said Letters Patent is hereby corrected as shown below:

Column 6,
Line 59, delete "I4" and replace with -- L4 --.

Column 8,
Line 32, insert -- 1 -- after "...a length L".

Signed and Sealed this

Twenty-fifth Day of April, 2006

JON W. DUDAS
*Director of the United States Patent and Trademark Office*